(12) United States Patent
Nakayama et al.

(10) Patent No.: US 10,775,620 B2
(45) Date of Patent: Sep. 15, 2020

(54) VIRTUAL-IMAGE FORMING DEVICE AND MOBILE OBJECT

(71) Applicants: Takahiro Nakayama, Kanagawa (JP); Hibiki Tatsuno, Kanagawa (JP); Takashi Kubota, Tokyo (JP); Naoki Nakamura, Saitama (JP)

(72) Inventors: Takahiro Nakayama, Kanagawa (JP); Hibiki Tatsuno, Kanagawa (JP); Takashi Kubota, Tokyo (JP); Naoki Nakamura, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/963,365

(22) Filed: Apr. 26, 2018

(65) Prior Publication Data

US 2018/0335624 A1  Nov. 22, 2018

(30) Foreign Application Priority Data

May 16, 2017 (JP) ................................ 2017-097388
Mar. 9, 2018 (JP) ................................ 2018-043286

(51) Int. Cl.
*G02B 27/01* (2006.01)
*G02B 27/00* (2006.01)
*G02B 3/08* (2006.01)

(52) U.S. Cl.
CPC .......... *G02B 27/0101* (2013.01); *G02B 3/08* (2013.01); *G02B 27/0025* (2013.01); *G02B 27/0179* (2013.01); *G02B 27/0103* (2013.01); *G02B 27/0149* (2013.01); *G02B 2027/011* (2013.01); *G02B 2027/015* (2013.01); *G02B 2027/0154* (2013.01); *G02B 2027/0159* (2013.01)

(58) Field of Classification Search
CPC .......... G02B 27/01; G02B 27/00; G02B 3/08; G02B 2027/01
See application file for complete search history.

(56) References Cited

U.S. PATENT DOCUMENTS

| 5,243,448 A | * | 9/1993 | Banbury | ............ G02B 27/0103 |
| | | | | 359/13 |
| 6,243,207 B1 | * | 6/2001 | Kawamura | .......... H04N 13/398 |
| | | | | 359/630 |
| 2004/0113866 A1 | | 6/2004 | Aoki et al. | |

(Continued)

FOREIGN PATENT DOCUMENTS

| JP | 61-046925 | 3/1986 |
| JP | 2009-122582 | 6/2009 |

(Continued)

OTHER PUBLICATIONS

Extended European Search Report dated Sep. 21, 2018.

*Primary Examiner* — Michelle M Iacoletti
*Assistant Examiner* — Danell L Owens
(74) *Attorney, Agent, or Firm* — Harness, Dickey & Pierce, P.L.C.

(57) ABSTRACT

A virtual-image forming device includes a device body having an opening; a real-image forming unit disposed within the device body to output light; a mirror to reflect the light output from the real-image forming unit; and an optical element. The optical element has positive power to refract the light reflected by the mirror and let the light exit through the opening to form of the light on a transmission and reflection member.

16 Claims, 4 Drawing Sheets

(56) References Cited

U.S. PATENT DOCUMENTS

| | | |
|---|---|---|
| 2005/0111115 A1 | 5/2005 | Tatsuno et al. |
| 2005/0157398 A1* | 7/2005 | Nagaoka ............ G02B 27/0025 |
| | | 359/630 |
| 2006/0209419 A1* | 9/2006 | Dobschal ........... G02B 27/0101 |
| | | 359/630 |
| 2007/0052833 A1* | 3/2007 | Matsui .................. G02B 13/08 |
| | | 348/335 |
| 2008/0238814 A1* | 10/2008 | Ishikawa ........... G02B 27/0101 |
| | | 345/7 |
| 2010/0296180 A1 | 11/2010 | Sudoh et al. |
| 2011/0051260 A1 | 3/2011 | Nakayama et al. |
| 2011/0128637 A1 | 6/2011 | Kubota |
| 2011/0141536 A1 | 6/2011 | Tatsuno |
| 2011/0310450 A1 | 12/2011 | Amada et al. |
| 2011/0310496 A1 | 12/2011 | Kubota et al. |
| 2011/0317285 A1 | 12/2011 | Ohashi et al. |
| 2012/0147485 A1 | 6/2012 | Kubota |
| 2012/0154768 A1 | 6/2012 | Tatsuno |
| 2012/0162753 A1 | 6/2012 | Tatsuno |
| 2013/0063754 A1 | 3/2013 | Saisho et al. |
| 2013/0070217 A1 | 3/2013 | Tatsuno |
| 2013/0107232 A1 | 5/2013 | Tatsuno |
| 2013/0107233 A1 | 5/2013 | Hirakawa et al. |
| 2013/0107234 A1 | 5/2013 | Nishina et al. |
| 2013/0194488 A1 | 8/2013 | Kubota et al. |
| 2013/0194681 A1 | 8/2013 | Ohashi et al. |
| 2013/0215321 A1 | 8/2013 | Nakayama |
| 2013/0308105 A1 | 11/2013 | Kubota |
| 2014/0016214 A1 | 1/2014 | Kubota et al. |
| 2014/0063612 A1 | 3/2014 | Kubota |
| 2014/0118818 A1 | 5/2014 | Nishina et al. |
| 2014/0126045 A1 | 5/2014 | Tatsuno et al. |
| 2014/0126072 A1 | 5/2014 | Ohashi et al. |
| 2014/0133002 A1 | 5/2014 | Tatsuno et al. |
| 2014/0139931 A1 | 5/2014 | Kubota |
| 2014/0146295 A1 | 5/2014 | Tatsuno |
| 2014/0160545 A1 | 6/2014 | Tatsuno |
| 2014/0184845 A1 | 7/2014 | Nakayama |
| 2014/0185143 A1 | 7/2014 | Kubota |
| 2014/0185144 A1 | 7/2014 | Kubota |
| 2014/0218699 A1 | 8/2014 | Tatsuno |
| 2014/0253821 A1* | 9/2014 | Takatoh ................ B60K 35/00 |
| | | 349/11 |
| 2014/0268072 A1 | 9/2014 | Takahashi et al. |
| 2014/0340658 A1 | 11/2014 | Takano et al. |
| 2014/0340768 A1 | 11/2014 | Kubota et al. |
| 2015/0062696 A1 | 3/2015 | Tatsuno et al. |
| 2015/0138625 A1 | 5/2015 | Tatsuno |
| 2015/0138649 A1 | 5/2015 | Kubota |
| 2015/0234158 A1 | 8/2015 | Tatsuno et al. |
| 2016/0054544 A1 | 2/2016 | Ohashi et al. |
| 2016/0077420 A1 | 3/2016 | Tatsuno |
| 2016/0103304 A1 | 4/2016 | Takano et al. |
| 2016/0116735 A1* | 4/2016 | Hayashi ............. G02B 27/0101 |
| | | 345/7 |
| 2016/0231542 A1 | 8/2016 | Tatsuno et al. |
| 2016/0266384 A1 | 9/2016 | Nakamura et al. |
| 2016/0363745 A1 | 12/2016 | Kubota |
| 2017/0003506 A1 | 1/2017 | Miyatake et al. |
| 2017/0023777 A1 | 1/2017 | Nakayama |
| 2017/0059971 A1 | 3/2017 | Takano et al. |
| 2017/0064268 A1 | 3/2017 | Shibayama et al. |
| 2017/0090094 A1 | 3/2017 | Ohsugi et al. |
| 2017/0154406 A1 | 6/2017 | Atsuumi et al. |
| 2017/0176729 A1 | 6/2017 | Kubota |
| 2017/0192239 A1 | 7/2017 | Nakamura et al. |
| 2017/0219806 A1 | 8/2017 | Kubota |
| 2017/0227761 A1 | 8/2017 | Nakamura et al. |
| 2017/0242226 A1 | 8/2017 | Kubota |
| 2018/0003928 A1 | 1/2018 | Tatsuno et al. |
| 2018/0003934 A1 | 1/2018 | Takano et al. |
| 2018/0003964 A1 | 1/2018 | Tatsuno |
| 2018/0045958 A1* | 2/2018 | Kuzuhara ............. B60K 35/00 |
| 2018/0074302 A1 | 3/2018 | Takano et al. |
| 2019/0212554 A1* | 7/2019 | Kikuchi ................ B60K 35/00 |

FOREIGN PATENT DOCUMENTS

| | | |
|---|---|---|
| JP | 2010-076533 | 4/2010 |
| JP | 2013-061554 | 4/2013 |

* cited by examiner

VIRTUAL-IMAGE FORMING DEVICE AND MOBILE OBJECT

CROSS-REFERENCE TO RELATED APPLICATIONS

This patent application is based on and claims priority pursuant to 35 U.S.C. § 119(a) to Japanese Patent Application No. 2017-097388, filed on May 16, 2017 and Japanese Patent Application No. 2018-043286, filed on Mar. 9, 2018 in the Japan Patent Office, the entire disclosures of which are hereby incorporated by reference herein.

BACKGROUND

Technical Field

Embodiments of the present disclosure relate to a virtual-image forming device and a mobile object.

Background Art

A virtual-image forming device has been known as a constituent element of a heads-up display (HUD), configured to cause an image, which is to be displayed on a display panel, to be reflected by a windshield of a vehicle and directed to a passenger.

Such a virtual-image forming device allows the passenger to recognize a virtual image representing various information.

SUMMARY

In one aspect of this disclosure, there is provided an improved virtual-image forming device including a device body having an opening; a real-image forming unit disposed within the device body to output light; a mirror to reflect the light output from the real-image forming unit; and an optical element. The optical element has positive power to refract the light reflected by the mirror and let the light exit through the opening to guide the light to a transmission and reflection member to form a virtual image of the light.

In another aspect of this disclosure there is provided an improved mobile object including the above-described virtual-image forming device and transmission and reflection member.

BRIEF DESCRIPTION OF THE DRAWINGS

The aforementioned and other aspects, features, and advantages of the present disclosure will be better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted.

DETAILED DESCRIPTION in describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

The present disclosure is not limited to the following embodiments, and the constituent elements of the embodiments includes those which can be easily conceived by those skilled in the art, substantially the same ones, and those in the following embodiments include those which can be easily conceived by those skilled in the art, substantially the same, and within equivalent ranges. Furthermore, various omissions, substitutions, changes and combinations of constituent elements can be made without departing from the gist of the following embodiments.

Figure 6:
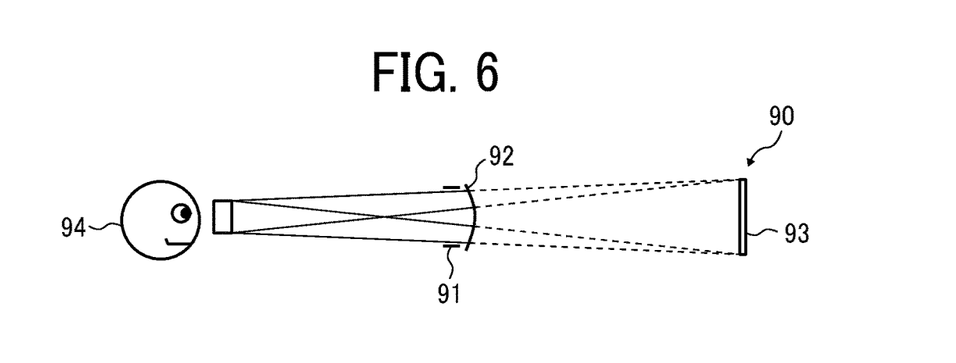
FIG. 6 is a conceptual illustration of a virtual-image forming device according to an embodiment of the present disclosure.

A virtual-image forming device includes a device body having a plane for forming a real-image to emit a light image, as illustrated in FIG. 6. The emitted light image is reflected by a concave mirror and directed to an observer through an opening, thus forming a virtual image. As a result, the observer 94 can visually recognize the virtual image as if the virtual image actually exists.

In the field of such a virtual-image forming device, the technology has been known that facilitates correcting aberrations and reduces the length of an optical path by disposing a lens element in an observation optical system, thus achieving a reduction in size of the device.

To achieve such a compact virtual-image forming device, a configuration has been proposed in which an aspherical Fresnel lens is additionally disposed in the downstream of a concave mirror along the optical path, which compensates for a distortion caused by the shape of the windshield to thereby facilitate correcting aberrations and achieve the reduction in size of device.

However, such a comparative device that includes the concave mirror has difficulties in reducing the size of the device because the size of the concave mirror is determined by the distance from an observer to a virtual image, the angle of view of the virtual image relative to the observer, and the field-of-view of the observer, and because the concave mirror occupies a large space in the device body.

Figure 8:
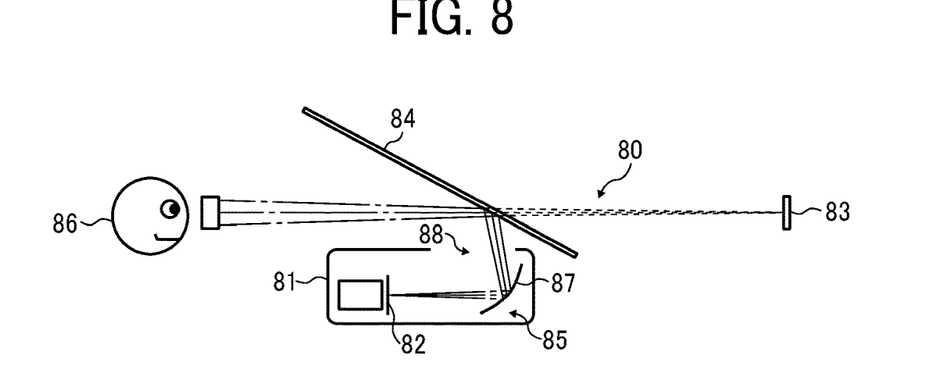
FIG. 8 is an illustration of technical difficulties involved with a comparative virtual-image forming device.

In a HUD 80 according to a comparative example as illustrated in FIG. 8 for explaining the technical difficulties involved with the comparative HUD 80, there is a need to virtually display a real image 82 formed on a display within a device body 81, as a virtual image 83 at a long distance.

In such a configuration according to the comparative example, an observation optical system 85 is further disposed to virtually display the real image 82 through a windshield 84 of a vehicle.

The observation optical system 85 defines an angle of view of a virtual image (virtual-image angle of view) relative to an observer 86, a distance from the observer 86 to the virtual image (virtual-image distance), and a range of field of view of (viewing area) the observer 86. The observation optical system 85 occupies a relatively large space of the device body 81, which might hamper reducing the size of the HUD.

As an example of the observation optical system 85, a concave mirror 87 is used in many cases to efficiently adjust the position of a virtual image corresponding to the position of the observer 86.

The size of the concave mirror 87 is determined by the virtual-image distance, the virtual-image angle of view, and the viewing area of the observer 86. The concave mirror 87 occupies a large volume in the observation optical system 85. In addition to the concave mirror 87, the optical path from the real-image 82 to the concave mirror 87 also occupies a large volume in the observation optical system 85.

The optical path can be reduced by the technology that facilitates correcting aberrations and reduces the length of an optical path by disposing a lens element in an observation optical system. However, a reduction in size of the concave mirror 87 is difficult because the size of an opening 88 of the device body 81 is substantially determined by, for example, the width of a light beam emitted from the device body 81 for virtually displaying the real-image 82.

In view of such circumstances, the present inventors have conceived of the following embodiments of the present disclosure.

A detailed description is given below of a virtual-image forming device 1 referring to the drawings.

Figure 1:
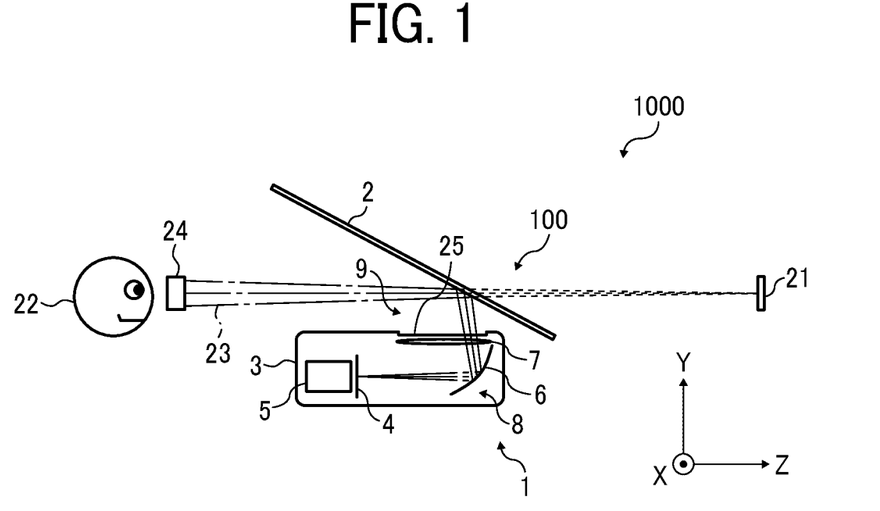
FIG. 1 is a schematic view of a virtual-image forming device according to an embodiment of the present disclosure.

FIG. 1 is an illustration of the virtual-image forming device 1 according east one embodiment of the present disclosure.

As illustrated in FIG. 1, the virtual-image forming device 1 and a transmission and reflection member 2 constitute a heads-up display (HUD) 100.

The HUD 100 is installed in a mobile object 1000 such as a vehicle, ship, and aircraft. The HUD 100 includes, for example, the transmission and reflection member 2, such as a windshield, disposed on each mobile object 1000 to transmit and reflect light. The HUD 100 allows an observer as a passenger in a vehicle to visually recognize navigation information representing a necessary speed of operating the mobile object 1000, using the transmission and reflection member 2.

The transmission and reflection member 2 serves as any known windshield that transmits some of incident light and reflects at least some of the remining incident light.

The virtual-image forming device 1 includes, for example, a device body 3, a real-image plane 4, a real-image forming unit 5, a mirror 6, and a lens element 7. The real-image plane 4 is, for example, a diffusing board or a microlens array, onto which a real-image is projected. The real-image forming unit 5 forms a real-image to be projected onto the real-image plane 4. The real-image plane, the real-image forming unit 5, the mirror 6, and the lens element 7 are disposed within the device body 3.

The mirror 6 and the lens element 7 constitute an observation optical system 8. The device body 3 has an opening 9 above the lens element 7, to allow a real-image of a light beam emitted from the real-image forming unit 5 to exit the device body 3.

In FIG. 1, X direction is defined as directions between a front side of the paper and a back side of the paper, Y direction is defined as up-and-down directions, and Z direction is defined as right and left directions. The same applies to the other figures. For example, the width direction of the mirror 6 is X direction while X direction is the right and left directions of the mirror 6 when viewed from the front side of the HUD 100.

Hereinafter, a description is given of a laser scanning configuration of the real-image plane 4 and the real-image forming unit 5. However, alternatively, in some embodiments, a liquid crystal display (LCD) configuration or a digital light processing (DLP) configuration is applicable in the present disclosure.

Figure 2:
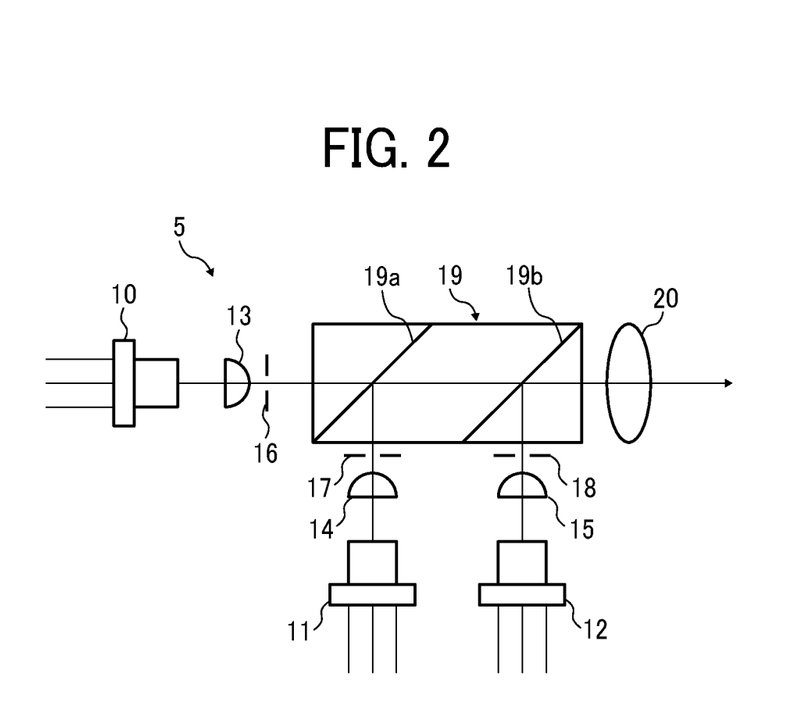
FIG. 2 is an illustration of a real-image forming unit according to an embodiment of the present disclosure, used in the virtual-image forming device of FIG. 1.

FIG. 2 is a schematic view of the real-image forming unit 5 according to an embodiment of the present disclosure. As illustrated in FIG. 2, the real-image forming unit 5 includes a red light source 10, a green light source 11, and a blue light source 12. The real-image forming unit 5 combines three light beams emitted from the light sources 10, 11, and 12 into one light beam (a combined light beam), and scans the real-image plane 4 with the combined light beam using a two-dimensional deflector to form a real-image on the real-image plane 4.

Each of the light sources 10, 11, and 12 is, for example, a laser diode (LD) as an end-surface emitting laser. However, alternatively, in some embodiments, a surface-emitting laser (VCSEL) is used as each of the light sources 10, 11, and 12.

Coupling lenses 13, 14, and 15 correspond to the light sources 10, 11, and 12, respectively. The coupling lenses 13, 14, and 15 serve to reduce the divergence of light beams (laser beams) emitted from the light sources 10, 11, and 12, respectively.

Apertures 16, 17, and 18 restricts the diameters of and shapes the light beams from the light sources 10, 11, and 12, respectively. The light beams, of which the divergence has been reduced by the coupling lenses 13, 14, and 15, are restricted and shaped by the apertures 16, 17, and 18, and enter a beam combining prism 19.

The beam combining prism 19 includes, for example, a first dichroic film 19*a* and a second dichroic film 19*b*. The first dichroic film 19*a* serves to transmit a red light beam therethrough and reflect a green light beam. The second dichroic film 19*b* serves to transmit a red light beam and a green light beam therethrough and reflect a blue light beam.

Accordingly, the beam combining prism 19 emits one light beam, in which a red light beam, a green light beam, and a blue light beam are combined, and the combined light beam of red, green, and blue colors is converted into a collimated light beam having a given diameter by a lens 20. The collimated light beam is a pixel displaying beam.

Note that the intensities of the laser beams of red, green, and blue colors that constitute the pixel displaying beam are modulated according to an image signal (i.e., image data) of a real image that is a "two-dimensional color image" to be displayed.

The intensity modulation is performed through direct modulation in which the semiconductor lasers are directly modulated or through external modulation in which the laser beams emitted from the semiconductor lasers are modulated.

In other words, the light-emission intensity of each of the light sources 10, 11, and 12 as semiconductor lasers is modulated by a driving unit according to the image signal of a corresponding color component.

The pixel displaying beam emitted from the lens 20 is directed to a two-dimensional deflector as an image forming element to be two-dimensionally deflected.

In the present example embodiment, the two-dimensional deflector is a micro mirror that moves on a pivot that is formed by two axes that are orthogonal to each other. More specifically, the two-dimensional deflector is, for example, a micro-electromechanical systems (MEMS) that includes a micro pivoting mirrors formed by, e.g., semiconductor processes.

The mirror 6 and the lens element 7 serve to eliminate the distortion of the real-image on the real-image plane 4 caused by the transmission and reflection member 2 while forming a virtual image 21 to virtually display the real-image.

Examples of the mirror 6 includes any known concave mirror, and examples of the lens element 7 include any known resin lens of cycloolefin polymer resin.

The observation optical system 8 of the virtual-image forming device 1 serves to enlarge the real-image formed on the real-image plane 4 to form the virtual image 21. The device body 3 further includes a cover 25 above the lens element 7 to prevent dust from entering the device body 3.

The lens mirror 7 disposed above the mirror 6 has positive power, which allows reducing the diameter of the light beam hitting the mirror 6, thereby allowing a reduction in area of the mirror 6.

FIG. 6 is a schematic view of a configuration of the virtual-image forming device 1 according to an embodiment of the present disclosure. In FIG. 6, a virtual-image forming device 90 includes a device body having a plane for forming a real-image (a real-image forming plane) to emit a light image. The emitted light image is reflected by a concave mirror 92 and directed to an observer 94 through an opening 91, thus forming a virtual image 93. As a result, the observer can visually recognize the virtual image 93 as if the virtual image 93 actually exists.

Figure 7:
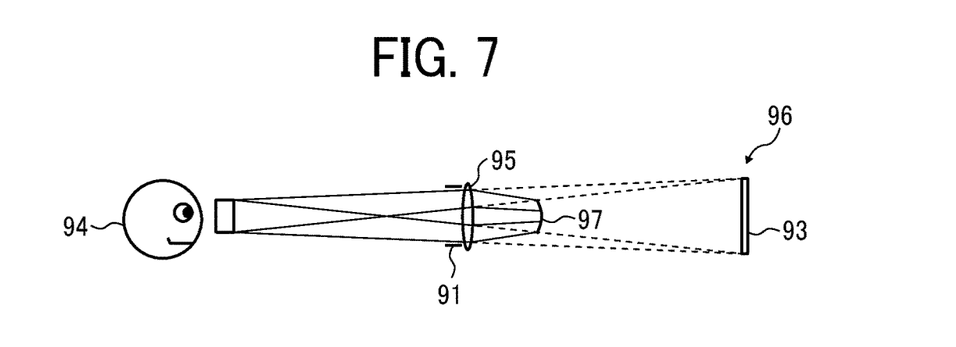
FIG. 7 is a conceptual illustration of the virtual-image forming device of FIG. 1.

In contrast, FIG. 7 is a conceptual illustration of the virtual-image forming device 1. FIG. 7 is an illustration of a virtual-image forming device 96 with a compact device body in which a convex lens 95 having positive power is disposed right in front of a concave mirror 97.

The size of the opening 91 disposed in the optical path is determined by the virtual-image angle of view (an angle of view of the virtual image 93 relative to an observer 94), the virtual-image distance (the distance from the observer 94 to the virtual image 93), and the viewing area (the range of a field of view of the observer 9). Accordingly, there is no significant change in size of the opening 91 without any change in space in which the virtual-image forming device 96 is disposed and the relative positions of the virtual image 93 and the observer 94.

For this reason, in the virtual-image forming device 96 according to the present embodiment, the convex lens 95 having positive power is disposed near the opening 91, to reduce the diameter of the light beam hitting the concave mirror 97 so that the concave mirror 97 smaller than the concave mirror 92 in FIG. 6 is used. The configuration according to the present embodiment achieves a reduction in size of device.

Referring back to FIG. 1, the transmission and reflection member 2 is disposed on a front side of the virtual image 21 in Z direction, that is, between the virtual image 21 and the observer 22. The transmission and reflection member 2 reflects a light beam for forming the virtual image 21, to the observer 22 side.

The observer 22 (for example, a passenger in a mobile object) visually recognizes the virtual image 21 at a prescribed position in the optical path of the light beam (laser beam) reflected by the transmission and reflection member 2.

Accordingly, the observer 22 visually recognizes the virtual image 21 with the light reflected by the transmission and reflection member 2.

When the relation of shape between the transmission and reflection member 2, the mirror 6 and the lens element 7 is established, a successful visual recognition is provided. With such a configuration, at each of angles of view of the virtual image that are two axes perpendicular to each other of the mirror 6 and the lens element 7, a virtual image 21 with little distortion is formed by the light beam passed through the mirror 6, the lens element 7, and the transmission and reflection member 2.

For example, the transmission and reflection member 2 has a shape with a reflecting surface on the room-interior (vehicle-interior) side having positive power. In this case, it is assumed that a vertical-directional section (YZ plane) and a horizontal-directional section (ZX plane) of the transmission and reflection member 2 differ in positive power of the reflecting surface such that the power of the vertical-directional section (YZ plane) is greater than the power of the horizontal-directional section (ZX plane).

In this case, the mirror 6 and the lens element 7 are preferably configured to have a shape in which the power of the horizontal-directional section (ZX plane) is greater than the power of a section (the vertical-directional section (YZ plane) orthogonal to the horizontal-directional section (ZX plane)) serving as an optical path to the vertical-directional section (YZ plane) of the transmission and reflection member 2. Thus, distortion of a virtual image is successfully corrected.

Further, configuring the mirror 6 to have greater power than the lens element 7 does facilitates reducing the light-ray effective range of the mirror 6 and achieving a compact virtual-image forming device 1.

The real image on the real-image plane 4 is formed by light rays having divergence. The divergence of the light rays forming the real image allows illuminating a relatively wide area close to the observer 22's eyes.

When the real image is formed by light rays without divergence, an extremely small area of the observer 22 is illuminated so that the observer 22 fails to visually recognize the virtual image 21 with a slight movement of the head. The area to allow the observer 22 to visually recognize the virtual image 21 is referred to as a viewing area 24.

The position of the head of the observer 22 differs between individuals. Accordingly, the positions of the virtual image 21 and the viewing area 24 are adjusted according to the individual position. To achieve an effective adjustment of the positions, the orientation of the mirror 6 having power is changed by a reflection event.

More specifically, the mirror 6 is supported by a supporting member fixed to the device body 3, to be rotatable around an axis perpendicular to the direction of the optical axis of the light beam emitted from the real-image forming unit 5. For example, the mirror 6 is supported by the supporting member to be rotatable around the X-axis.

In the virtual-image forming device 1 according to the present embodiment, a single mirror 6 is disposed as an adjustable mirror, and the lens element 7 is disposed below the opening 9 serving as an exit for a light beam. This arrangement provides a compact virtual-image forming device 1 that exhibits a maximum performance for correcting aberrations with a minimum configuration.

When the virtual-image forming device 1 according to the present embodiment is installed in a mobile object 1000, it is difficult to have the position of the eyes of the observer 22 coincide with the position of the virtual-image forming device 1. Further, in many cases, the virtual-image forming device 1 is disposed away from the observer 22 to a certain extent. Thus, it is difficult to obtain the relative positions of the eyes of the observer 22 and the virtual-image forming device 1 with high accuracy.

To obtain stable visibility even in such a case, setting the viewing area 24 that sufficiently covers the range of the eyes of the observer 22 and adjusting the position of the viewing area 24 are important factors.

In the configuration according to the present embodiment, an appropriate size of the opening 9 is determined by geometric calculation using the product specification: the angle of view of virtual image, the distance to the virtual image, and the viewing area 24 of the observer 22, irrespective of the size of the virtual-image forming device 1. This means that reduction in size of the device body 3 has little influence on the size of the opening 9.

As described above, by disposing the lens element 7 closer to the virtual image 21 than the mirror 6, that is, by arranging the lens element 7 at a position closer to the opening 9 than the mirror 6, an increase in size of the entire device is sufficiently prevented even when the lens element 7 has the same size as that of the opening 9.

Further, the mirror 6 and the lens element 7 share the power to correct aberrations, thereby reducing the length of the optical path between the real-image plane 4 and the mirror 6, which leads to a reduction in space for the mirror 6, thus achieving the reduction in size of the device.

In this configuration, for example, the principal point of the positive power is allowed to move to the virtual image 21 side, thereby reducing the length of the optical path between the real-image plane 4 and the mirror 6 without a significant change in magnification of the virtual image 21, which allows a reduction in space for the mirror 6, compared to a comparative configuration including the mirror 6 without the lens element 7.

Note that, in the configuration according to the present embodiment, the lens element 7 includes a single positive lens having positive power, but no limitation is intended thereby. Thus, alternatively, in some embodiments, the lens element 7 includes a plurality of positive lenses. Alternatively, in some other embodiments, the lens element 7 includes a single set of or a plurality of sets of a plurality of lens elements formed by combining any number of positive lenses and negative lenses having negative power, to have positive power as a whole. In this case, the lens element 7 includes a negative lens, which allows correcting chromatic aberration, resulting in an increase in visibility of the virtual image 21.

In some embodiments, an optical element such as a diffraction element or a hologram element is arranged as the lens element 7 to exert the same positive power as a whole.

Such a configuration allows for a thinner or smaller element than a lens element having the same function, thus achieving a reduction in device as a whole.

Thus, the lens element 7 is configured to transmit a light beam while having positive power as a whole, which exhibits the above-described advantageous operation and effects.

Figure 3:
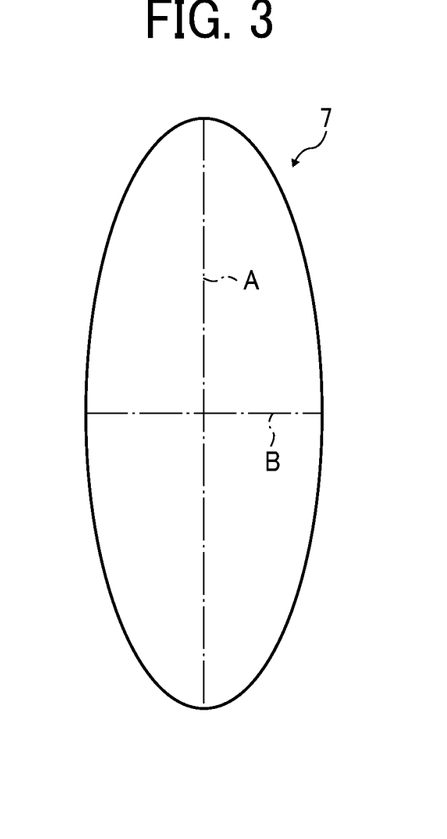
FIG. 3 is an illustration of a first cross-sectional surface in a direction of a first angle of view of a virtual image and a second cross-sectional surface in a direction of a second angle of view of the virtual image in a lens element used in the virtual-image forming device of FIG. 1.

FIG. 3 is an illustration of a first cross-sectional surface in a direction of a first angle of view of a virtual image and a second-sectional surface in a direction of a second angle of view of the virtual image smaller than the first angle of view in the lens element according to an embodiment of the present disclosure. In FIG. 3, the first cross-sectional surface is indicated by line A, and the second cross-sectional surface is indicated by line B. The first cross-sectional surface is perpendicular to the second cross-sectional surface. The first cross-sectional surface has power different from that of the second cross-sectional surface.

The angles of view of the virtual image 21 are not symmetric with respect to a point. In general, the angles of view of the virtual image 21 significantly differ between X direction and Y direction, and the transmission and reflection member 2 has power that differs between directions.

With the configuration in which the lens element 7 has power that differs between the first cross-sectional surface and the second cross-sectional surface, distortion generated is effectively corrected.

Preferably, in the present embodiment, the lens element 7 has each surface having power.

With such a configuration, the number of surfaces that correct aberrations increases, and the performance of aberration correction improves. Thus, a virtual-image forming device 1 is provided that increases the visibility of the virtual image 21 while achieving a reduction in size.

Preferably, in the present embodiment, the lens element 7 has at least one surface made of a Fresnel lens.

With this configuration, the size in the height direction of the lens element 7 is reduced and the virtual image forming apparatus 1 is further miniaturized.

In the present disclosure, a windshield is used as the transmission and reflection member 2. Accordingly, when the direction in which a light beam is emitted from the virtual-image forming device 1 is substantially the vertical direction (Y direction), some light rays are allowed to pass through the transmission and reflection member 2 in the upward direction.

In an automobile for example, if light passes through the windshield at an approximately horizontal angle, i.e., at an angle close to the angle of Z direction, the oncoming vehicle and surrounding pedestrians might be dazzled. However, with the configuration that allows the light to pass through the windshield in the upward direction, i.e., at an angle close to the angle of Y direction, the possibility that the transmitted light harms the surrounding pedestrian and outcoming vehicle is reduced and safety is increased.

In the above-described embodiment, the cover 25 is disposed above the lens element 7 to prevent dust from entering the device body 3.

Figure 4:
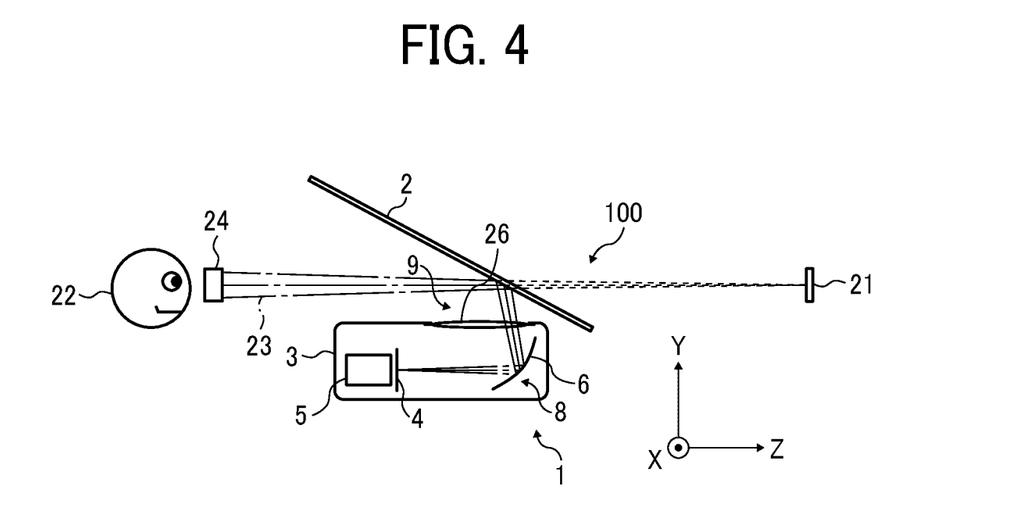
FIG. 4 is a schematic view of a virtual-image forming device according to a variation of an embodiment of the present disclosure.

FIG. 4 is an illustration of the virtual-image forming device 1 according to a variation of the above-described embodiment. As illustrated in FIG. 4, a dustproof lens 26 having a dustproof function is used instead of the lens element 7 and the cover 25.

The dustproof lens 26 has a lens portion in the center, and has an area other than the lens portion, i.e., an area surrounding the lens portion, tightly close contact with the edge of the opening 9 of the device body 3.

Note that the expression "close contact" means that the area other than the lens portion is in contact with the edge of the opening 9 to prevent dust from entering the interior of the device body 3. That is, the entire circumference of the dustproof lens 26 is not fixed to the device body 3.

With this configuration, there is no need to dispose the cover 25 in the device body 3, which achieves a reduction in cost and a reduction in the size of the device.

Figure 9:
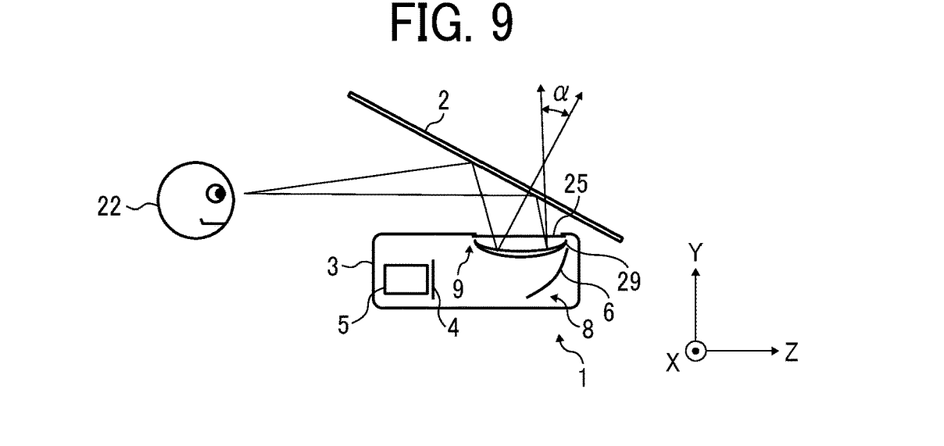
FIG. 9 is an illustration of a lens element used in a virtual-image forming device according to a variation of an embodiment of the present disclosure.

FIG. 9 is an illustration of a lens element 29 used in the virtual-image forming device 1 according to a variation of the above-described embodiment of the present disclosure. In the virtual-image forming device 1 according to a variation of the present embodiment, the lens element 29 is used instead of the lens element 7 as illustrated in FIG. 9. The lens element 29 has a concave surface that faces the outside of the virtual-image forming device 1 and serves to allow light emitted from the real-image forming unit 5 to exit the virtual-image forming device 1.

Figure 10:
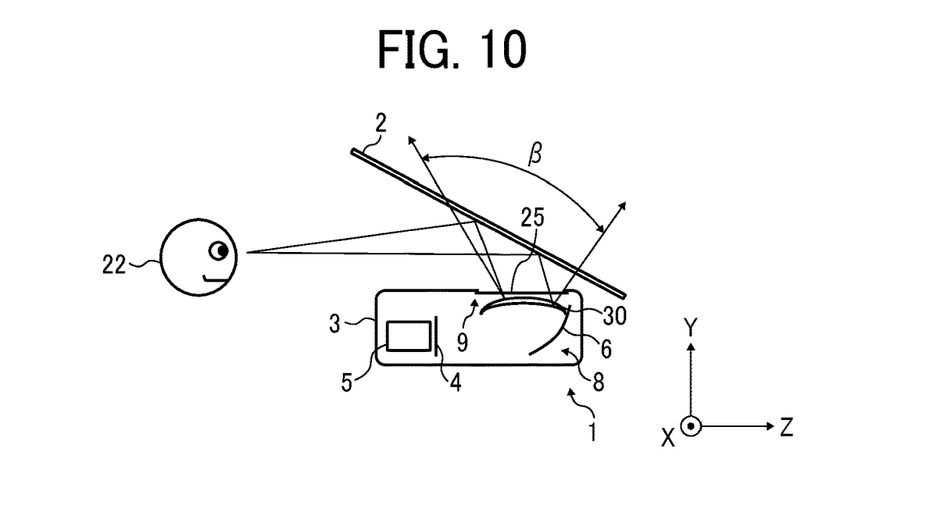
FIG. 10 is an illustration of a lens element used in a virtual-image forming device according to another variation of an embodiment of the present disclosure.

FIG. 10 is an illustration of a lens element 30 used in the virtual-image forming device 1 according to another variation of the above-described embodiment. In the virtual-image forming device 1 in FIG. 10, the lens element 30 having a convex surface (contrary to the lens element 29) that faces the outside of the virtual-image forming device 1 is used.

Each of FIGS. 9 and 10 represents an angle of view of an unnecessary virtual image of external light, formed by a surface (also referred to as an outer surface) of the lens element 29 (in FIG. 9) or the lens element 30 (in FIG. 10) that allows light to exit the virtual-image forming device 1.

Such a phenomenon occurs when the sunlight is reflected by the outer surface of the lens element 29 or 30 and reaches the observer 22 so that the observer 22 observes an unnecessary virtual image of sunlight.

The lens element 30 has the outer surface of a convex shape, which serves to diverge light rays at an angle of view 13 to form an unnecessary virtual image.

In contrast, the lens element 29 has the outer surface of a concave shape, which serves to converge light rays at an angle of view α to form an unnecessary virtual image.

Such a configuration provided with the lens element 29 reduces the range in which an unnecessary virtual image of external light reaches the observer 22. Accordingly, the visibility of a virtual image by the observer 22 further improves.

In the present variation, the case in which the lens element 29 is used is described. However, no limitation is intended thereby. Thus, alternatively, in some examples, a dustproof lens configured in the same manner as the dustproof lens 26 is used instead of the lens element 29.

In the present embodiment, the lens element 7 has positive power.

In some embodiments, the mirror 6 also has positive power.

With such a configuration, the mirror 6 and the lens element 7 share positive power while forming a virtual image 21, thereby facilitating correcting aberrations while achieving the reduction in size of device.

Same as the lens element 7, the mirror 6 preferably has power that differs between a first cross-sectional surface in a direction of a first angle of view of a virtual image and a second cross-sectional surface, which is perpendicular to the first cross-sectional surface, in a direction of a second angle of view of the virtual image smaller than the first angle of view.

This configuration allows increasing the performance of correcting distortion same as the lens element 7.

In the above-described virtual image forming apparatus 1, the mirror 6 and the lens element 7 correct aberrations by establishing a relative position of the mirror 6 and the lens element 7. Accordingly, with a reduction in manufacturing error due to the assembly or part accuracy, aberrations are successfully corrected.

Figure 5:
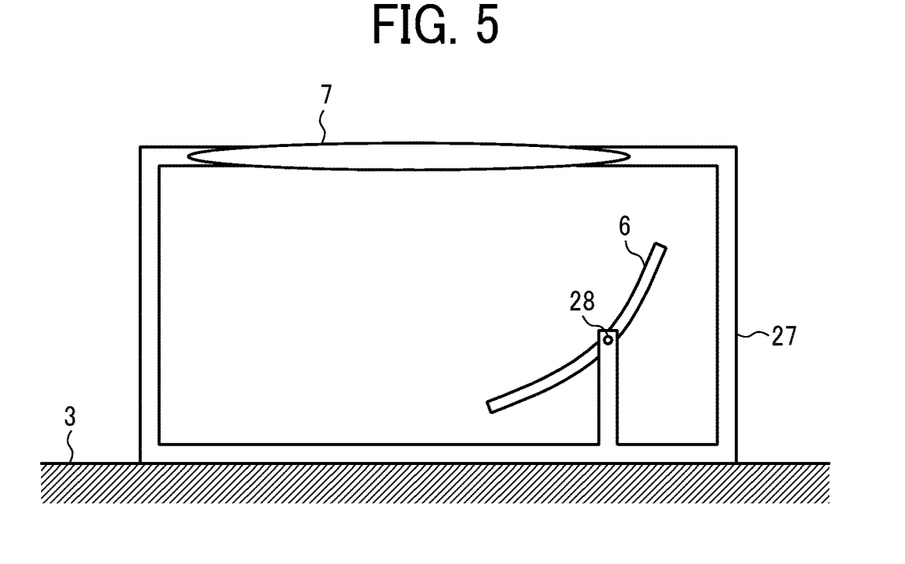
FIG. 5 is an illustration of a member for holding a mirror and a lens element used in the virtual-image forming device according to a variation of an embodiment of the present disclosure.

FIG. 5 is an illustration of a holding member 27 that holds the mirror 6 and the lens element 7 in the virtual-image forming 1 according to a variation according to the above-described embodiment. As illustrated in FIG. 5, the mirror 6 and the lens element 7 are supported by the same holding member 27. The holding member 27 is attached onto the device body 3, which eliminates or reduces the manufacturing error, thus preventing a deterioration in visibility of the virtual image 21.

Note that the mirror 6 is attached to the holding member 27 to be rotatable around a support shall 28 extending in X direction and positioned within the virtual-image forming device 1.

This configuration further allows adjusting the positions of the virtual image 21 and the viewing area 24 by adjusting the position of the mirror 6, thereby increasing the mountability of the device to a mobile object 1000.

In the above-described embodiment, the mirror 6 is attached to be rotatable about X direction. However, alternatively, in some embodiments, the mirror 6 is rotatable around an axis tilted with respect to the X direction.

Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. A virtual-image forming device comprising:
   a device body having an opening;
   a real-image forming unit disposed within the device body to output light;
   a mirror positioned to reflect the light output from the real-image forming unit, the mirror having a first positive power; and
   an optical element having a second positive power, the second positive power being less than the first positive power of the mirror, the optical element positioned to refract the light reflected by the mirror and let the light exit through the opening to guide the light to a transmission and reflection member to form a virtual image of the light,
   wherein the mirror and the optical element are configured to have a shape including a first directional section having a horizontal direction and a second directional section having a direction orthogonal to the first directional section, a power of the first directional section being greater than a power of the second directional section.

2. The virtual-image forming device according to claim 1, wherein the optical element has at least one surface made of a Fresnel lens.

3. The virtual-image forming device according to claim 1, wherein the mirror and the optical element are positioned such that the light exits through the opening in a direction substantially vertical to the opening.

4. The virtual-image forming device according to claim 1, wherein the optical element seals the opening on the device body.

5. The virtual-image forming device according to claim 1, wherein the optical element has a concave surface.

6. The virtual-image forming device according to claim 1, wherein the mirror and the optical element are positioned by a common member in the device body.

7. The virtual-image forming device according to claim 6, wherein
the real-image forming unit is configured to output the light in a first direction, and
the mirror is supported by a supporting member fixed to the common member and configured to be rotatable around an axis perpendicular to the first direction.

8. The virtual-image forming device according to claim 1, wherein the mirror forms a variable angle relative to the optical element.

9. The virtual-image forming device according to claim 1, wherein the optical element includes a plurality of lenses.

10. The virtual-image forming device according to claim 9, wherein the plurality of lenses includes a negative lens.

11. The virtual-image forming device according to claim 1, wherein the optical element includes a diffractive element.

12. A mobile object comprising:
the virtual-image forming device according to claim 1; and
the transmission and reflection member.

13. The virtual-image forming device according to claim 1, wherein the real-image forming unit is a laser scanning apparatus.

14. The virtual-image forming device according to claim 13, wherein the real-image forming unit includes a red light source, a blue light source, and a green light source.

15. The virtual-image forming device according to claim 1, wherein the optical element includes a hologram element.

16. A virtual-image forming device comprising:
a device body having an opening;
a real-image forming unit disposed within the device body to output light;
a mirror positioned to reflect the light output from the real-image forming unit; and
an optical element positioned to refract the light reflected by the mirror and let the light exit through the opening to guide the light to a transmission and reflection member to form a virtual image of the light,
wherein the mirror and the optical element are configured to have a shape including a first directional section having a horizontal direction and a second directional section having a direction orthogonal to the first directional section, a power of the first directional section being greater than a power of the second directional section.

* * * * *